Figure 1:
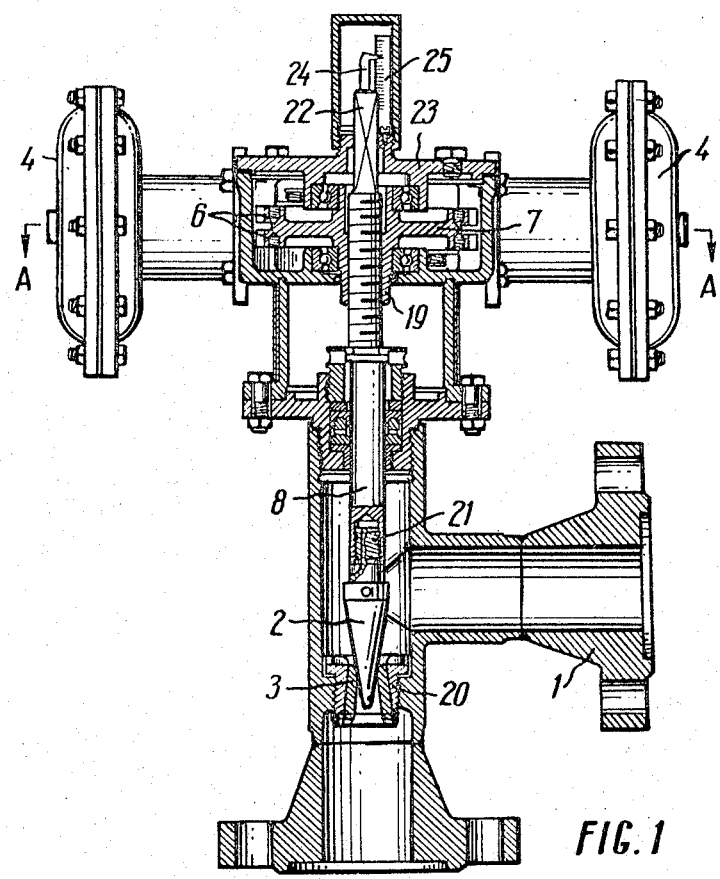

United States Patent Office 3,332,438
Patented July 25, 1967

3,332,438
FLOW CONTROL VALVE FOR OIL AND GAS WELLS
Asker Alekper Ogly Abdullaev, Baku, Fuad Agasamedovich Alizade, Sumgait, Mukhtar Makhmud Ogly Aslanov, Baku, Genrikh Zalmanovich Vodovozov, Sumgait, and Solomon Romanovich Grobshtein and Elmira Mamed Kyzy Ragimova, Baku, U.S.S.R. assignors to Nauchno-Issledovatelsky i Proektny Institut Neftekhimavtomat, Sumgait, U.S.S.R.
Filed Apr. 14, 1965, Ser. No. 448,007
3 Claims. (Cl. 137—554)

This invention relates to valves for controlling oil or gas wells, and more particularly to adjustable surface valves provided with a pneumatic drive for the remote control thereof.

It is known that the main object in a flowing well production is the establishment of a proper rate of oil or gas flow which is set up by way of a study of the well performance under various conditions. The optimum rate of flow is selected from the data thus obtained while other factors characterizing the performance of a flowing well are also maintained within the allowable limits.

The adjustment of recovery from a flowing well is effected at the present time by means of bushing type surface valves provided with a constant orifice which produce the requisite throttling (back pressure) on the head of the well. The thus employed constant orifice valves have not solved the problem of adjusting the performance of flowing wells. The constant orifice valves are not effective since they involve frequent inspection, as well as replacements if corroded with sand or other foreign matter which is often contained in the flow.

The optimum performance of flowing wells under varying reservoir conditions calls for a smooth control thereof by adjusting the rate of flow and this can be achieved only with the aid of an adjustable valve.

Pneumatically driven adjustable valves have been designed on the principles of controlling and adjusting a flowing well by the differential between the pressures ahead of (cushion) and behind the valve. The operation of such valves is made difficult due to the need for maintaining with high precision the pressure above the diaphragm of the valve drive. A drop in the working pressure above the diaphragm and thus a full opening of the valve orifice will result in the breakdown of the unit being adjusted (i.e. oil or gas well).

An object of the invention is the elimination of the above-mentioned disadvantages.

A principal object of the invention is the provision of an adjustable surface valve for the remote control of oil or gas wells, with such valve being suitable for adjusting the valve orifice within a wide range for a smooth control of the rate of flow.

The above object has been achieved by utilizing control valve for oil and gas wells, including an adjusting needle for varying the valve orifice in relation to the seat, with the needle being actuated by a pneumatic drive which includes two diaphragm heads supplied with compressed gas, and provided with plungers adapted to actuate a ratchet wheel having two gear rims with oppositely directed teeth, the ratchet wheel being threaded onto a spindle carrying the adjusting needle at the lower end thereof and a device is associated with the valve for signalling the turning of the ratchet wheel.

More specifically, signalling device comprises a spring-loaded plunger, one end of which actuates the teeth of each of the rims via a ball, and the opposite end embodies a micro-switch for closing the contact as the ratchet wheel turns through one pitch.

It is desirable to have the adjusting needle and the seat manufactured from a Cerametal alloy.

The adjustable valve will ensure smooth control of the rate of flow within a predetermined range, thus maintaining the operative optimum performance of the well, which may further constitute an element in the system of automatic control of oil and gas wells, while relieving the operator from daily examination and frequent replacements of the valves.

Figure 2:
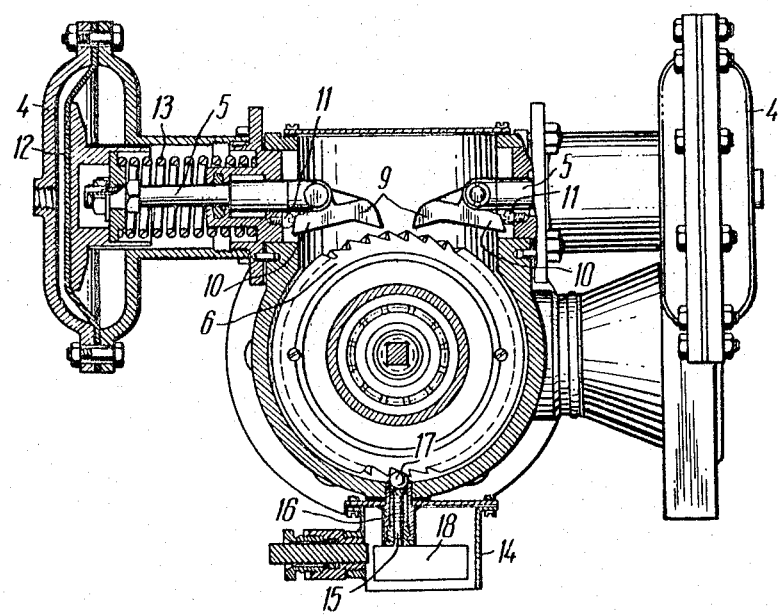

The invention is further explained by the following description in which a preferred embodiment has been set forth in detail in conjunction with the accompanying drawings, wherein:

FIG. 1 is a side view partly in section and partly in elevation of the valve; and FIG. 2 is a partial sectional view taken along A—A line of FIG. 1.

The adjustable valve is mounted in one of the delivery lines of the flow head by means of the housing flanges (FIG. 1). A needle 2 is so positioned in relation to seat 3 that the rated withdrawal of liquid is ensured. If the flow conditions of the well or the valve orifice are changed due to the corrosion of the needle or the seat, the rate of flow will be changed accordingly and to which end the operator sends a respective command from a control panel. The controlling pulse of compressed gas is transmitted to one of a pair of diaphragm heads 4 which are identical in design.

Each of said heads includes a plunger 5 (FIG. 2) which is adapted to mesh with a respective gear rim 6 of a ratchet wheel 7, and the gear rims are rigidly connected with the ratchet wheel which is provided with oppositely directed teeth. The ratchet wheel 7 is connected through a threaded portion with a spindle 8 capable of vertical movement and the needle 2 is fixed at the lower end of the spindle. The plunger 5 includes a pawl 9 and in the initial position the pawl is out of engagement with the gear rim 6 of ratchet wheel 7, and rear end 10 of the pawl which extends angularly in relation to the axis of the plunger 5 rests against the head of a lock screw 11. At the beginning of the plunger movement under the action of diaphragm 12 following the supply of the compressed air the pawl 9 released by the compression of a spring 13 from the lock screw 11 is somewhat deflected toward the gear rim 6 meshing therewith, the diaphragm 12 upon being moved further turns the ratchet wheel 7 through one pitch of an increment angle of 9 degrees. When turning through each pitch, the spindle 8 together with the needle 2 is moved vertically by 0.05 mm., thus changing the orifice of the valve by less than 1 mm.$^2$ By relieving the diaphragm head 4 from pressure, the spring 13 returns the plunger 5 to its initial position as illustrated in FIG. 2.

At each turn of the ratchet wheel 7 a signalling device 14 is actuated, thus confirming that the command has been received and fulfilled. The signalling device 14 as shown in FIG. 2 includes a plunger 15 loaded with a spring 16, and one end of the plunger coacts through a ball 17 with both gear rims 6 simultaneously, and slides over the teeth during each turn of the ratchet wheel 7 in either direction. The opposite end of the plunger cooperates with a micro-switch 18 which closes its contact when the ratchet wheel 7 turns through each pitch.

If it is needed to increase or decrease the rate of flow, the operator transmits control signals to the respective diaphragm head 4. The number of compressed air pulses fed to the diaphragm head in question depends on the required value of adjustment of the rate of flow. Provision has also been made for a manual control and this is effected by means of a spanner inserted into a port (not shown in the drawing) in the body of the valve, with the spanner turning a nut 19 of the manual control which is integral with the ratchet wheel 7, thus ensuring the requisite motion of spindle 8 and hence the needle 2 relative to the seat 3.

The seat 3 is mounted within a guide bushing 20 connected with body 1 through a threaded joint. The replacement of said seat involves stripping of the bushing 20. The needle 2 brazed onto a metallic threaded shoe 21 is secured through the shoe to the lower end of the spindle 8 thus providing for ready replacement if needed.

The spindle 8 is provided with an upper end 22 of square cross-section and moves over guide planes on a cover 23 of the body 1. An indicator 24 on the upper end of the spindle shows the position of the needle 2 relative to the seat 3 and the position can be read from a scale 25 secured on the cover 23.

The needle 2 and the seat 3 are of a wear-resistant Cerametal alloy and such components are readily replaceable if necessary.

The invention is not to be confined to any strict conformity to the showings in the drawings but changes and modifications may be made therein so long as such changes and modifications mark no material departure from the spirit and scope of the appended claims.

What is claimed is:

1. A valve for controlling flow in oil and gas wells including: a body; a spindle mounted in said body for movement longitudinally thereof; a valve seat connected in said body and having an orifice therein; an adjusting needle secured to the lower end of said spindle and adapted to enter the orifice of the seat upon longitudinal movement of the spindle; a ratchet wheel provided with two gear rims having oppositely directed teeth; a threaded connection between the ratchet wheel and the upper portion of the spindle; two diaphragm heads positioned on opposite sides of said ratchet wheel and supplied with compressed gas; plungers operably related to said heads and coacting with said respective gear rims for turning the ratchet wheel thus moving said spindle and needle; and means operably related to the ratchet wheel for signalling the turn of the ratchet wheel, said signalling means including means cooperable simultaneously with the teeth of said gear rims and displaceable perpendicularly to the axis of rotation of the ratchet wheel and switch means actuable by said displaceable means.

2. The valve according to claim 1, in which the signalling means includes a micro-switch and a spring-loaded plunger, one end of said plungers coacting through a ball with the teeth of said gear rims, and the opposite end of said plunger coacting with the micro-switch so that the switch closes its contact as the ratchet wheel turns through each pitch.

3. The valve according to claim 1, in which the adjusting needle and the seat are Cerametal alloy.

No references cited.

M. CAREY NELSON, *Primary Examiner.*

H. T. KLINKSIEK, *Assistant Examiner.*